United States Patent [19]

Runkle

[11] Patent Number: 4,475,336
[45] Date of Patent: Oct. 9, 1984

[54] BRAKING APPARATUS FOR AN AUTOMOTIVE VEHICLE

[75] Inventor: Dean E. Runkle, LaPorte, Ind.

[73] Assignee: The Bendix Corporation, Southfield, Mich.

[21] Appl. No.: 294,111

[22] Filed: Aug. 19, 1981

[51] Int. Cl.³ .............................................. F15B 7/00
[52] U.S. Cl. ..................... 60/545; 60/547.1; 60/582; 60/431
[58] Field of Search .............. 60/545, 547.1, 562, 60/582, 431

[56] References Cited

U.S. PATENT DOCUMENTS

| | | | |
|---|---|---|---|
| 3,618,321 | 11/1971 | Moran | 60/545 |
| 3,677,002 | 7/1972 | Fulmer | 60/545 |
| 3,782,781 | 1/1974 | Lewis . | |
| 3,871,497 | 3/1975 | Bessiere | 60/545 |
| 3,898,808 | 8/1975 | Ewald | 60/582 |
| 3,898,809 | 8/1975 | Baker | 60/547.1 |
| 3,967,536 | 7/1976 | Bach . | |
| 4,028,891 | 6/1977 | Belart | 60/562 |
| 4,143,514 | 3/1979 | Leiber | 60/545 |
| 4,206,605 | 6/1980 | Mehren | 60/545 |
| 4,212,166 | 7/1980 | Tang | 60/582 |
| 4,224,832 | 9/1980 | Prohaska | 60/545 |
| 4,281,585 | 8/1981 | Runkle et al. | 91/5 |
| 4,398,389 | 8/1983 | Horvath | 60/545 |

Primary Examiner—Abraham Hershkovitz
Attorney, Agent, or Firm—Paul David Schoenle; Ken C. Decker

[57] ABSTRACT

A braking apparatus (28) includes a housing (38). The housing (38) includes therein: a master cylinder section (40) for supplying pressurized fluid to the brakes (24) of an automotive vehicle (10) to effect a brake application, a hydraulic booster section (42) for assisting the master cylinder section (40) to effect a brake application, a fluid pumping section (44) driven by an electric motor, for supplying pressurized fluid to the hydraulic booster section (42), and a reservoir section (46) supplying a single fluid to the sections 40, 42, and 44. The electric motor driving the fluid pumping section (44) receives energy from the vehicle (10) only in response to a need for braking. The brake booster (28) includes a fluid pressure accumulator (147) providing pressurized fluid to the booster section (42) during a brake application. The accumulator (147) also provides for power-assisted braking in the event of a failure of the motor-driven pumping section (44).

5 Claims, 5 Drawing Figures

BRAKING APPARATUS FOR AN AUTOMOTIVE VEHICLE

This invention relates to a braking apparatus for an automotive vehicle. More specifically, this invention relates to an electrically powered apparatus which integrates into a single unit: a master cylinder for the vehicle brakes, a hydraulically powered booster for the master cylinder, a source of hydraulic power for the booster, and a fluid reservoir supplying a single fluid to both the master cylinder and to the booster. The source of hydraulic power for the booster is a pump driven by an electric motor which is operated only during a brake application. The apparatus includes a fluid pressure accumulator which provides an initial short-term fluid pressure source during a brake application until the motor-driven pump builds pressure. The fluid pressure accumulator also provides for power-assisted braking in the event of a failure of the motor-driven pump.

Accordingly, this invention relates to a braking apparatus for an automotive vehicle having brakes actuatable by fluid pressure to retard motion of said vehicle, an input member movable in response to an operator input to effect a brake actuation, a source of electrical energy, and electrical circuit means for distributing said electrical energy; said braking apparatus including: master cylinder means for supplying fluid pressure to said brakes in response to said operator input, fluid pressure responsive booster means for providing a force assisting said operator input, a single fluid pumping means for supplying fluid pressure to said booster means during a brake actuation, and fluid pressure accumulator means for receiving fluid pressure from said fluid pumping means and for supplying fluid pressure to said booster means during a brake actuation.

Diesel engines are increasingly replacing spark-ignition engines as the power source in automobiles. Because diesel engines do not provide a vacuum source with which to operate the vacuum brake boosters previously used with spark-ignition engines, hydraulic brake boosters are frequently used in conjunction with diesel engines. The hydraulic brake booster employs the power steering pump of the vehicle as a source of hydraulic power. However, at the same time that diesel engines are becoming more popular, automobiles are being made smaller in the interest of energy efficiency. Because of their relatively light weight, many small automobiles employ manual steering and do not require power steering. When these small automobiles are equipped with disc brakes, it is desirable to provide a power assist for braking despite the relatively small size of the vehicle. Consequently, a small vehicle with a diesel engine, manual steering, and disc brakes is left without a source of power to provide for power-assisted braking. Accordingly, it has been proposed to drive a vacuum pump or a hydraulic pump from the diesel engine of the vehicle. The engine-driven pump would be employed to power a vacuum or a hydraulic brake booster. However, such an engine-driven pump causes a parasitic power drag for the vehicle engine. In view of the increasing demand for high fuel mileage and energy-efficient vehicles, such a power drag on the vehicle engine is not desirable.

A characteristic which all vehicles have in common regardless of their size is an electrical system. Accordingly, it is an object of this invention to provide an alternative to prior engine-powered brake boosters by providing a brake booster which is powered by the electrical system of the vehicle.

A hydraulic brake booster is known in accordance with FIG. 1 of the U.S. Pat. No. 3,967,536 granted July 6, 1976, to Bach, which employs a motor-driven pump as an auxiliary source of hydraulic pressure for the booster. However, the brake booster illustrated in the Bach patent employs an engine-driven power steering pump as the primary source of hydraulic power for the brake booster. Additionally, the brake booster invented by Bach is a separate unit. The brake booster is not integrated with a master cylinder for the brakes. Nor do the master cylinder and the brake booster share a single fluid.

Another hydraulic brake booster is known in accordance with the U.S. Pat. No. 3,898,808, granted Aug. 12, 1975, to Ewald, et al., in which the hydraulic brake booster and power steering system employ a single fluid. Further, the master cylinder for the brakes and the hydraulic brake booster are integrated into a single housing. However, the braking system illustrated in the patent to Ewald employs only an engine-driven power steering pump as a source of hydraulic power.

Still another hydraulic brake booster is known in accordance with U.S. Pat. No. 3,782,781, granted Jan. 1, 1974, to Lewis, wherein the master cylinder for the vehicle brakes and the hydraulic booster for the master cylinder are integrated into a single housing and share a common fluid. Additionally, a motor-driven pump is provided so that the booster may be powered by the electrical system of the vehicle.

Each of the preceding brake boosters employ the power steering pump of the vehicle as a primary fluid pressure source and, therefore, causes a parasitic power loss for the vehicle engine.

The invention as claimed is intended to avoid the drawbacks of prior hydraulic brake boosters by providing a braking apparatus for an automotive vehicle characterized in that said single fluid pumping means is electrically powered, said electrical circuit means including switch means closing in response to said operator input during every brake actuation to supply electrical energy to said single fluid pumping means only during said brake actuation to commence a first phrase thereof, said booster means including operator-operated valve means for modulating said assisting force in response to operator input, said fluid pressure accumulator means including second valve means for in a first position closing communication of fluid pressure from said accumulator means to said booster means and in a second position opening said communication to supply fluid pressure to said booster means, said booster means and said second valve means including coacting connecting means for operatively connecting said operator-operated valve means with said second valve means to shift the latter to said second position in response to said operator input to communicate fluid pressure from said accumulator means to said booster means during said first phase of a brake actuation, said fluid pressure accumulator means supplying fluid pressure to said booster means during said first phase of a brake actuation until said fluid pumping means is able to supply a greater fluid pressure to said booster means to begin a second phase of said brake actuation, said fluid pumping means recharging said accumulator means with fluid pressure during said second phase of a brake actuation.

The advantages offered by the invention are mainly that the invention requires energy from the vehicle only in response to a demand for braking; the vehicle engine is freed of power-absorbing pumps for the braking system so that the engine may power the vehicle with maximum efficiency; the invention may be constructed in a single housing with a minimum of leakage paths; and a single fluid is used in the invention so that only a single reservoir is required. Moreover, the integration of the master cylinder, brake booster, hydraulic power source, and reservoir into a single unit results in a relatively small, light weight and energy-efficient braing apparatus which is particularly appropriate for the energy-efficient vehicles needed at the present time and for the future.

Moreover, the invention also provides a solution to the problem of how to provide power-assisted braking for electrically driven vehicles. Because electrically driven vehicles inherently have a source of electrical energy, the invention is uniquely applicable to these vehicles. Additionally, in those electrically driven vehicles which are of the energy-storage type, the distance that the vehicle can travel before needing recharging may be increased by the invention because the brake booster requires energy from the vehicle only during braking.

Three ways of carrying out the invention are described in detail below with reference to drawings which illustrate only these three specific embodiments, in which.

Figure 1:
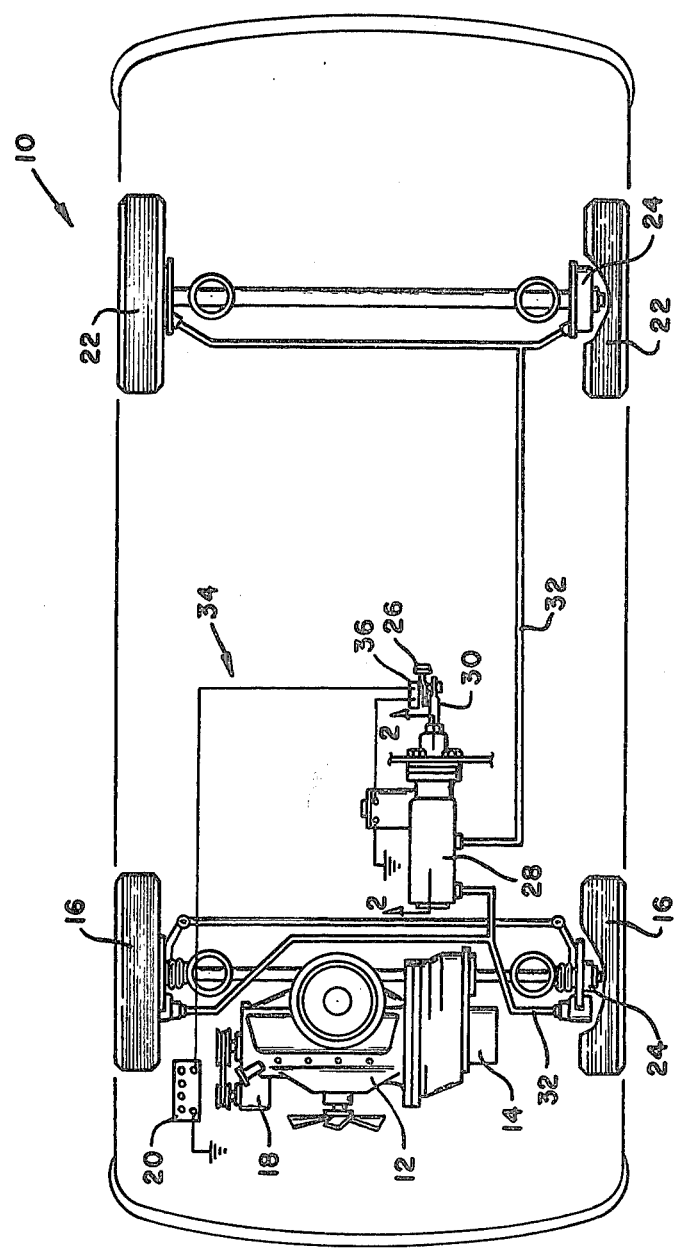
FIG. 1 is a fragmentary plan view, partly in cross section, of an automobile embodying the invention.

With reference to FIG. 1, an automotive vehicle generally indicated by the numeral 10, includes an engine 12 which drives the automobile via a transmission 14 which is connected to a pair of front dirigible wheels 16. The engine 12 also drives an alternator 18 to provide electrical power to the automobile via a storage battery 20. The pair of front wheels 16 and a pair of rear wheels 22 are each provided with a hydraulically actuated brake 24 (only two of which are visible in FIG. 1). In order to effect a brake application, a brake pedal 26 is disposed in the passenger compartment of the automobile. The brake pedal 26 is operatively connected to a braking apparatus 28 via a rod 30. The braking apparatus 28 is connected via conduits 32 with the brakes 24. The braking apparatus 28 is also connected to the storage battery 20 by an electrical circuit 34. A switch 36 in the circuit 34 is closed in response to movement of the pedal 26 to effect a brake application. The circuit 34 supplies electrical energy to the booster 28 when the switch 36 is closed.

Figure 2:
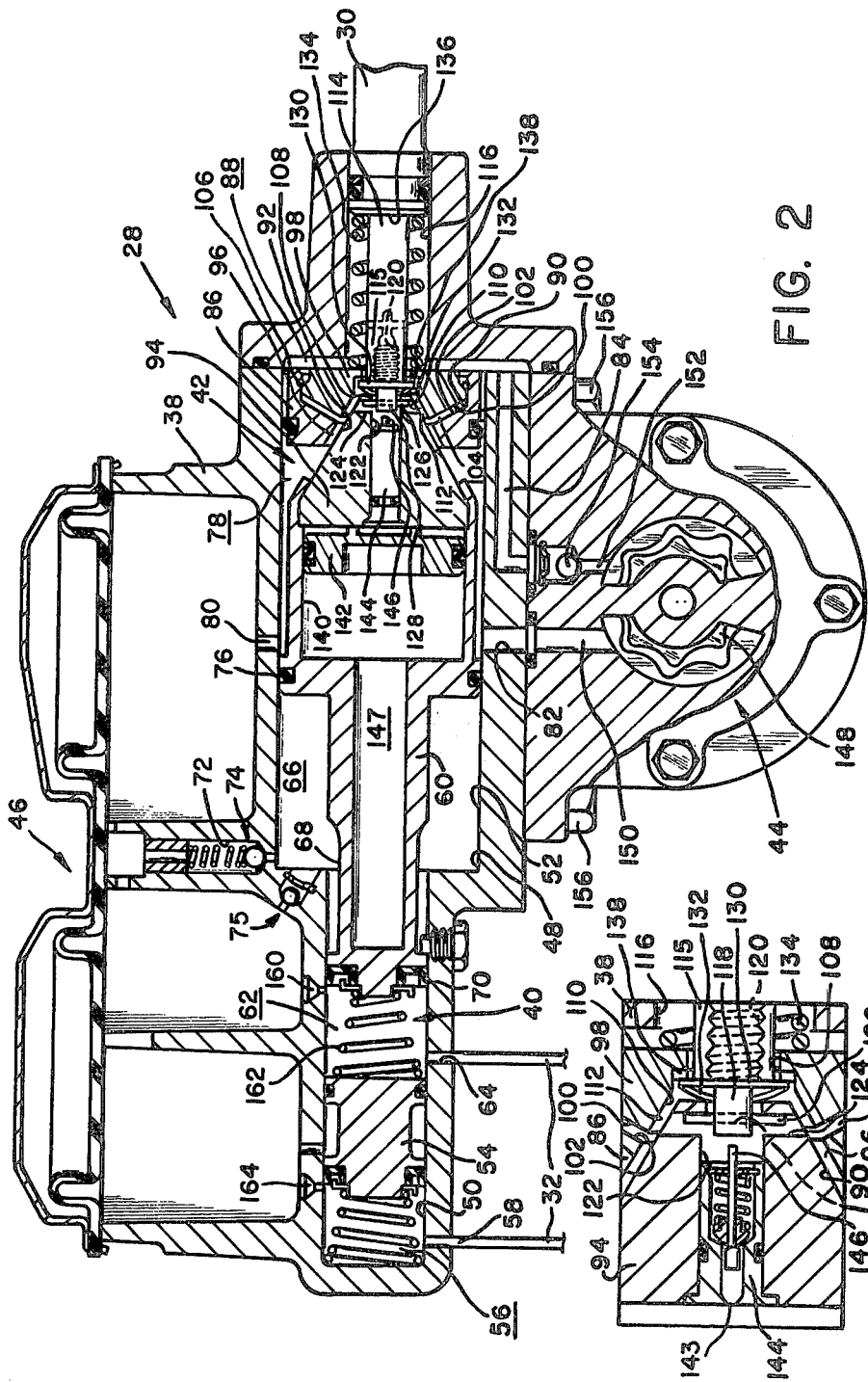
FIG. 2 is a fragmentary view, partly in cross section, taken along the line 2—2 of FIG. 1.
Figure 5:
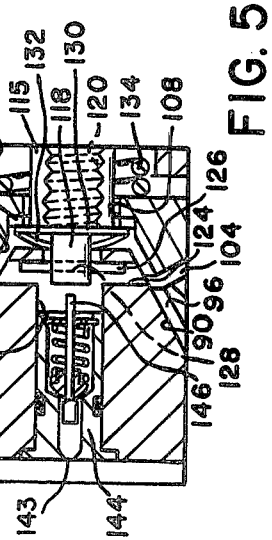
FIG. 5 is an enlarged view of an encircled portion of FIG. 3.

Turning now to FIGS. 2 and 5, the braking apparatus 28 includes a housing 38 which includes a master cylinder section 40, a booster section 42, a fluid pumping section 44, and a reservoir section 46.

The housing 38 defines a stepped bore 48 having a small diameter portion 50 and a large diameter portion 52. The pressure-responsive piston 54 is movably received in the bore portion 50. The piston 50 cooperates with the housing 38 to define a primary pressure chamber 56. An outlet port 58 connects the primary pressure chamber 56 with the brakes 24 at the rear wheels 22 of vehicle 10 via conduits 32.

A stepped piston 60 is movably received in the small diameter bore portion 50 and in the large diameter bore portion 52. The stepped piston 60 cooperates with the housing 38 and with the piston 54 to define a secondary pressure chamber 62. An outlet port 64 connects the secondary pressure chamber 62 with the brakes 24 at the front wheels 16 via conduits 32. The stepped piston 60 further cooperates with the housing 38 to define a differential-volume chamber 66. The differential-volume chamber 66 is connected to the secondary pressure chamber 62 via an annular recess 68 on the stepped piston 60. A unidirectional seal 70 is carried by the stepped piston 60 and engages the small diameter bore portion 50 so that fluid may flow from the chamber 66 to the chamber 62. Accordingly, the master cylinder section 40 defines a fast-fill or quick-take-up type of master cylinder for the brakes of the vehicle. A passage 72 connects the chamber 66 with the reservoir 46. A pressure-responsive relief valve 74 is disposed in the passage 72. The relief valve 74 is normally closed and opens at a predetermined pressure. As a result, the chamber 66 supplies fluid to the chamber 62 via the seal 70 during the initial part of a brake application until the predetermined pressure is reached in the chambers 62 and 66. When the predetermined pressure is reached in the chamber 66, the valve 74 opens to vent the chamber 66 to the reservoir 46. Consequently, the large diameter portion of the piston 60 does not substantially oppose the operator input during the remainder of the brake application. A check valve 75 provides for replenishment of the chamber 66 when a brake application is terminated.

The stepped piston 60 carries a seal 76 which separates the chamber 66 from an annular vent chamber 78. The seal 76 also separates the master cylinder section 40 from the booster section 42. The annular vent chamber 78 is connected to the reservoir 46 via a passage 80. A passage 82 provides fluid communication from the annular vent chamber 78 to the fluid pumping section 44. The fluid pumping section 44 returns pressurized fluid to the bore portion 52 via a passage 84. An annular fluid-movable working piston 86 is received in the large diameter bore portion 52. The piston 86 cooperates with the housing 38 to define a working chamber 88 to which the passage 84 communicates pressurized fluid from the pumping section 44. The fluid-movable working piston 86 cooperates with the stepped piston 60 to define the annular chamber 78. Additionally, the fluid-movable working piston 86 is annular and defines a bore 90. A portion 92 of the bore 90 is tapered. The end 94 of the stepped piston 60 is tapered and is received in the bore portion 92 of piston 86. The fluid-movable piston 86 defines a multiplicity of grooves 96 which define a fluid flow path at the interface of the pistons 60 and 86. Additionally, the bore 90 connects the grooves 96 to the chamber 88. Consequently, the chamber 88 is connected to the reservoir 46 via the bore 90, grooves 96, annular chamber 78, and the passage 80.

Upon inspection of FIG. 2, it will be seen that an annular valve member 98 is movably received in the bore 90 of the piston 86. The valve member 98 defines a tapered surface at 100 which substantially coincides with a portion 102 of the bore 90. Consequently, the fluid-movable piston 86 and the valve member 98 cooperate to define a variable-area flow path 104. The flow path 104 connects the chamber 88 to the flow path defined by the grooves 96. A wire-ring 106 retains the valve member 98 within the bore 90.

The valve member 98 defines a bore 108 communicating axially therethrough. The bore 108 defines a tapered surface at 110. The tapered surface 110 cooperates with the tapered end 94 of the stepped piston 60 to define a variable-area flow path 112. The flow path 112 communicates the chamber 88 with the flow path defined by the grooves 96 of piston 86. Consequently, the valve member 98, and pistons 60 and 86 cooperate to define a pair of variable-area flow paths 104 and 112. The flow paths 104 and 112 are in parallel between the chamber 88 and the vent chamber 78. Movement of the valve member 98 leftward relative to the pistons 60 and 86, viewing FIG. 2, reduces the cross-sectional flow areas of both flow paths 104 and 112.

An input assembly 114 is movably received in a bore 116 which is defined in the housing 38. The input assembly 114 includes a rod 30 which is connected to the brake pedal 26. The rod 30 includes a portion 115 which extends into the chamber 88 and through the bore 108 in the valve member 98. The portion 115 defines an axially-extending radial clearance with the bore 108 so that the valve member 98 and the portion 115 cooperate to define a part of the flow path 112. A member 118 is threadably received in a bore 120 in the end of the portion 115. The member 118 extends axially into a bore 122 defined by the portion 94 of the stepped piston 60. A radial bore 124 is defined in the portion 94 and a radially-extending pin 126 is movably received in the bore 124. The radial bore 124 communicates with the flow path 112 upstream (toward the chamber 88) of the variable-area restriction defined by the valve member 98 with the end 94. The pin 126 is carried in a cross-bore 128 defined in the member 118. Consequently, the stepped piston 60 and the rod 30 are connected for axial movement in unison with each other. Additionally, a limited amount of relative axial motion of the piston 60 and rod 30 is provided because the radial bore 124 is larger in diameter than is the pin 126. An annular washer 130 is secured to the left end of the portion 116 by the member 118, viewing FIG. 2. A Belleville spring washer 132 is carried on the member 118 between the end 94 of the stepped piston 60 and the washer 130. The Belleville spring washer 132 biases the stepped piston 60 and the rod 30 to an axially-extended relative position.

A coil spring 134 is carried on the portion 116 of the rod 30 between the valve member 98 and a shoulder 136. The spring 134 biases the valve member 98 against the annular washer 130. The valve member 98 defines radially-extending grooves 138 which provide for fluid flow past the washer 130.

The stepped piston 60 defines a bore 140 therein. A movable wall or piston 142 is movably received in the bore 140. The axial bore 122 connects the bore 140 to the radial bore 124. Consequently, the bore 140 is connected to the chamber 88 via the flow path 112. A pressure-responsive triple-function valve member 144 is received in the bore 122. The threaded member 118 is engageable with an operating stem 146 which extends axially from the valve member 144. The bore 140, piston 142, and triple-function valve member 144 define a fluid pressure accumulator 147 for the booster section 42. The portion of the bore 140 to the left of the piston 142 is charged with a pressurized gas at the time that the stepped piston 60 is assembled. Consequently, the piston 142 is movable leftward in the bore 140, viewing FIG. 2, as pressurized fluid is received from the chamber 88 via the bore 122 and valve member 144. Of course, the piston 142 is reciprocable in the bore 140 in response to the influx and efflux of fluid via the bore 122 and valve member 144.

The pumping section 44 includes a gear-rotor pumping element 148 which is connected to the passages 82 and 84 by passages 150 and 152, respectively. The gear-rotor pump is driven by an electric motor (not shown) which is connected in the electrical circuit 34 (shown in FIG. 1). A check valve 154 is defined in the passage 152 to prevent the flow of pressurized fluid from the chamber 88 via the passage 152. The pumping section 44 is secured to the remainder of the electro-hydraulic brake booster 28 by threaded fasteners 156 which engage threaded bores (not shown) defined by the housing 38.

A brake application is effected when a vehicle operator pivots the brake pedal 26 to move the rod 30 leftward in the FIGS. When the rod 30 is moved leftward in the bore 116, the stepped piston 60 is moved leftward by the Belleville washer 132. As a result, the unidirectional seal 70 moves leftward across a port 160 to trap and pressurize fluid in the chamber 62. The pressurized fluid in the chamber 62 and contraction of a spring 162 moves the pressure-responsive piston 54 leftwardly across a port 164 to trap and pressurize fluid in the chamber 56. Continued leftward movement of the stepped piston 60 supplies fluid from the chamber 66 to the chamber 62 via the recess 68 and unidirectional seal 70 while increasing the fluid pressures in the chambers 56, 62, and 66. As the fluid pressure in the chambers 56, 62, and 66 are increased, the Belleville spring 132 is contracted by the input force applied by the vehicle operator to the rod 30. Consequently, the valve member 98 is moved leftwardly toward engagement with the portion 94 of piston 60 and with the fluid-movable working piston 86. The flow paths 104 and 112 are contracted by the leftward relative movement of the working piston 86 and valve member 98. The member 118 is moved leftwardly into engagement with the operating stem 146 of the valve member 144 to open the valve so that the accumulator 147 supplies pressurized fluid past the operating stem to the chamber 88 via the flow path 112. The pressurized fluid in the chamber 88 provides a leftwardly directed force on the piston 86 assisting leftward movement of the stepped piston 60 by the input assembly 114. At the same time that the brake pedal 26 pivots to move the rod 30 to effect a brake application, the switch 36 closes to supply electrical power to the motor driving pump 148. Consequently, the pump 148 begins to operate and to build fluid pressure in the passage 152. When the fluid pressure in the passage 152 equals and exceeds the pressure in chamber 88 supplied from the accumulator 147, the check valve 154 opens so that the pumping section 44 provides hydraulic power to the booster during the remainder of the brake application. Moreover, the pressurized fluid communicated to the chamber 88 by the pumping section 44 is communicated to the accumulator 147 via the flow path 112 and valve member 144 so that the accumulator is recharged with pressurized fluid.

Those skilled in the art will recognize that the accumulator 147 provides for rapid transient response of the brake booster during a brake application. Further, the accumulator 147 provides for power-assisted braking at a reduced level of assistance in the event of a failure of the pumping section 44. Additionally, manual or nonassisted braking is available because the input rod 30 is connected for movement in unison with the stepped piston 60.

Figure 3:
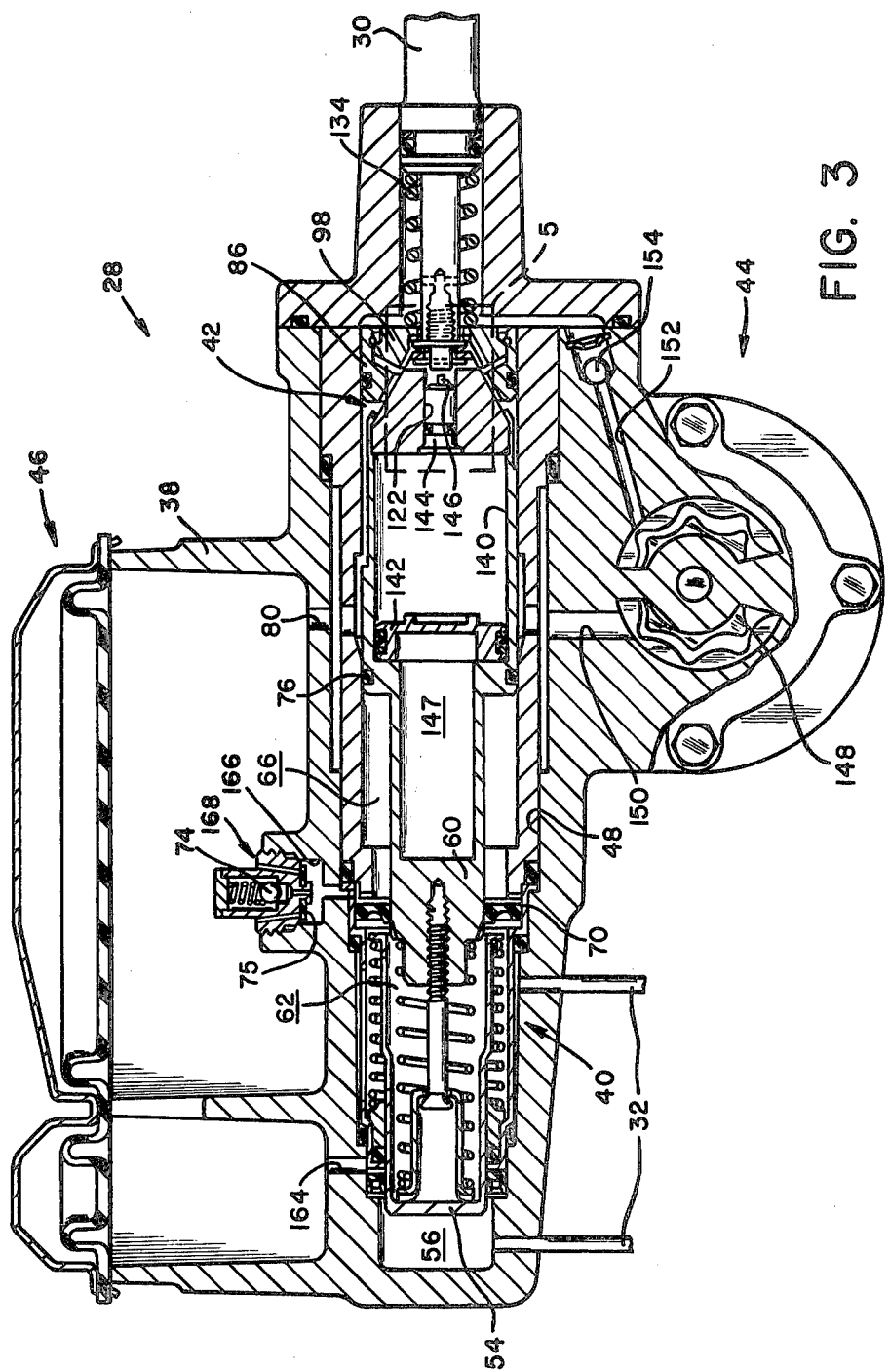
FIG. 3 is a fragmentary view, similar to FIG. 2 and partly in cross section, of an alternative embodiment of the invention.

FIG. 3 illustrates an alternative embodiment of the invention wherein the same reference numerals are used to designate features which are analogous in structure or function to those illustrated in FIG. 2. Upon inspection of FIG. 3, it will be apparent that the booster section 42 and the pumping section 44 of the braking apparatus 28 are substantially the same as that illustrated in FIG. 2. However, in contrast to the embodiment illustrated by FIG. 2, the portion of the housing 38 which receives the gear-rotor pump 148 is integral with the remainder of the housing.

Additionally, the master cylinder section 40 is of the displacement type, as is illustrated in the allowed U.S. patent application Ser. No. 110,151, filed Jan. 7, 1980, the disclosure of which is expressly incorporated herein to the extent necessary for a complete understanding of the present invention. A passage 166 opens to the differential-volume chamber 66. A valve member 168 is received in the passage 166. The valve member 168 includes a relief valve 74 and a check valve 75 which provides for fast-fill of the pressure chamber 62 during a brake application and for replenishment of the pressure chambers 62 and 66. Further, the piston 142 of the accumulator 147 is illustrated in the position it occupies when the accumulator 147 is fully charged with pressurized fluid.

Figure 4:
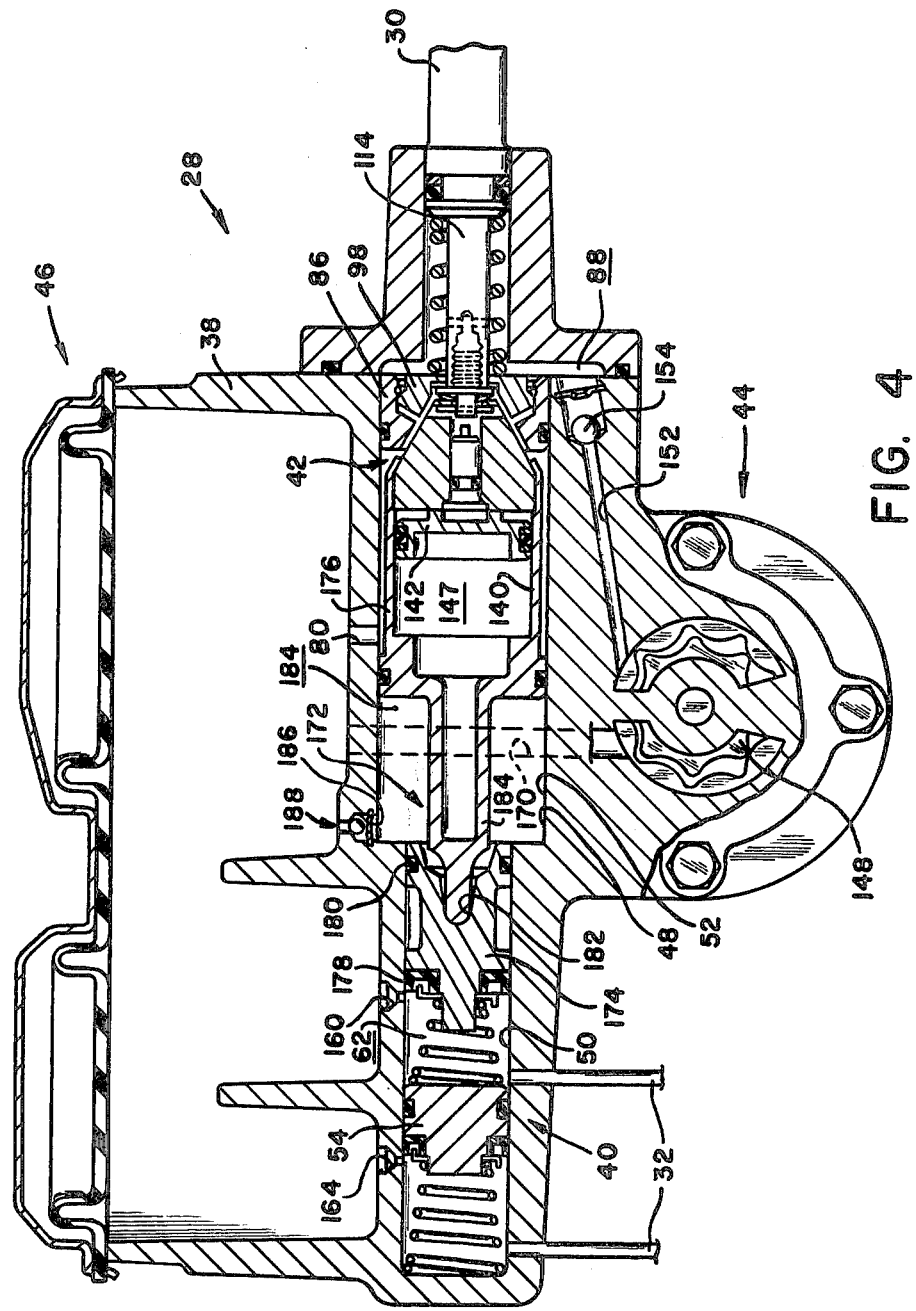
FIG. 4 is a fragmentary view, similar to FIGS. 2 and 3, of another alternative embodiment of the invention.

FIG. 4 illustrates yet another alternative embodiment of the invention wherein features which are analogous in structure or function to those illustrated in FIGS. 2 and 3 are referenced by the same numeral previously used. Upon inspection of FIG. 4, it will be apparent that the booster section 42 and fluid pumping section 44 are substantially the same as that illustrated by FIG. 3. However, the housing 38 defines a passage 170 which connects the pumping section 44 directly to the reservoir 46.

The master cylinder section 40 of the braking apparatus illustrated in FIG. 4 includes a two-part stepped piston 172. The two-part stepped piston 172 includes a small diameter portion 174 and a large diameter portion 176. The small diameter piston portion 174 is movably received in the bore portion 50. A lip seal 178 and an omnidirectional seal 180 are carried by the piston portion 174. Further, the small diameter piston portion defines a recess 182.

The large diameter portion 176 of piston 172 is movably received in the bore portion 52. An axially-extending member 184 is defined by the piston portion 176. Member 184 is received into the recess 182 of piston portion 174 when the master cylinder section 40 is in a nonbraking condition, as is illustrated in FIG. 4. The piston portions 174 and 176 cooperate with the housing 38 to define a differential-volume chamber 184. A passage 186 connects the chamber 184 to the reservoir 46. A check valve 188 is disposed in the passage 186 so that fluid may flow from the reservoir 46 into the chamber 184 via the passage 186. The check valve 188 prevents fluid flow in the opposite direction through the passage 186.

When a brake application is effected, the stepped piston 172 is moved leftwardly by the input assembly 114 and by the booster section 42. Initially, leftward movement of the large diameter piston portion 176 is communicated to the small diameter piston portion 174 by the member 184. However, the leftward movement of the piston 172 contracts the chamber 184 and pressurizes the fluid therein. When the fluid pressure in chamber 184 exceeds the fluid pressure in the chamber 62, the small diameter piston portion 174 is moved leftwardly away from the member 184. Thereafter, during a brake application, force is transferred from the input assembly 114 and booster 42 to the pressure-responsive piston 54 and piston portion 174 via the pressurized fluid in the chamber 184.

I claim:

1. A braking apparatus for an automotive vehicle having brakes actuatable by fluid pressure to retard motion of said vehicle, an input member movable in response to an operator input to effect a brake actuation, a source of electrical energy, and electrical circuit means for distributing said electrical energy; said braking apparatus including: master cylinder means for supplying fluid pressure to said brakes in response to said operator input, fluid pressure responsive booster means substantially defining a pressure chamber and providing a force assisting said operator input, a single fluid pumping means for supplying fluid pressure directly to said pressure chamber via a check valve during a brake actuation, and fluid pressure accumulator means for receiving fluid pressure from said fluid pumping means only via said pressure chamber and for supplying fluid pressure to said booster means during the brake actuation, said electrical circuit means including switch means closing in response to said operator input during every brake actuation to supply electrical energy to said single fluid pumping means only during said brake actuation to commence a first phase thereof wherein said fluid pumping means communicates fluid pressure to said pressure chamber, said booster means including operator-operated valve means for modulating said assisting force in response to operator input, said fluid pressure accumulator means including second valve means for in a first position closing communication of fluid pressure from said accumulator means to said booster means and in a second position opening said communication to supply fluid pressure to said booster means, said booster means and said second valve means including coacting connecting means for operatively connecting said operator-operated valve means with said second valve means to shift the latter to said second position in response to said operator input to communicate fluid pressure from said accumulator means to said booster means during said first phase of every brake actuation, said fluid pressure accumulator means supplying fluid pressure to said pressure chamber during said first phase of a brake actuation until said fluid pumping means is able to supply a greater fluid pressure to said booster means to begin a second phase of said brake actuation while said coacting connecting means retains said second valve means in its second position, said fluid pumping means recharging said accumulator means with fluid pressure during said second phase of a brake actuation while at the same time continuing to communicate fluid pressure to said pressure chamber during said second phase of a brake actuation.

2. The invention of claim 1 wherein said operator-operated valve means includes a first piston movable within a bore of a housing of said braking apparatus to communicate fluid pressure to said brakes, said first piston defining a conically tapering end, an annular working piston received upon said end and sealingly engaging said housing bore, said working piston defining a bore having a conically tapering portion matching with the end of said first piston, said first piston and said working piston cooperating with said housing to bound a vent chamber, said working piston cooperating with said housing to bound the working chamber, said working piston defining a groove extending between said working chamber and said vent chamber adjacent said tapering end, and annular valve member movably received within a conically tapering portion of said bore, said valve member defining a tapering surface portion cooperating with the tapering bore portion to define a first variable-area flow path, said valve member defining a bore having a conically tapering portion matching the tapering end, said bore portion cooperating with said end to define a second variable-area flow path in fluid flow parallel with said first variable area flow path, said first and second variable area flow paths simultaneously increasing and decreasing in flow area in response to movement of said valve member and being in fluid flow series with said groove, said input member drivingly coupling with said annular valve member.

3. The invention of claim 2 wherein said first piston carries said fluid pressure accumulator therewithin, said first piston defining an axial bore communicating said fluid pressure accumulator with said second variable-area flow path, and said axial bore sealingly receiving said second valve means.

4. The invention of claim 2 wherein said housing (38) carries an annular sealing member (70) substantially immovable relative thereto, said first piston (60) sealingly cooperating with said sealing member (70), and said first piston (60) moving relative to said sealing member (70) to communicate fluid pressure to said brakes (24).

5. The invention of claim 1 wherein said master cylinder means (40) comprises a two-part piston assembly (172) movably and sealingly received within a bore (48) defined by a housing (38) of said braking apparatus (28), one part (174) of said two-part piston assembly (172) defining a diameter which is less than the diameter of the other part (176) of said two-part piston assembly.

* * * * *